(12) United States Patent
Luo

(10) Patent No.: US 12,174,766 B2
(45) Date of Patent: Dec. 24, 2024

(54) DATA MOVING METHOD FOR DIRECT MEMORY ACCESS APPARATUS

(71) Applicant: Beijing ESWIN Computing Technology Co., Ltd., Beijing (CN)

(72) Inventor: Shilin Luo, Beijing (CN)

(73) Assignee: BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 77 days.

(21) Appl. No.: 18/089,776

(22) Filed: Dec. 28, 2022

(65) Prior Publication Data

US 2023/0214340 A1     Jul. 6, 2023

(30) Foreign Application Priority Data

Dec. 30, 2021 (CN) .......................... 202111659145.9

(51) Int. Cl.
    *G06F 13/28*         (2006.01)
    *G06F 13/16*         (2006.01)

(52) U.S. Cl.
    CPC .......... *G06F 13/28* (2013.01); *G06F 13/1668* (2013.01)

(58) Field of Classification Search
    CPC ............................. H04N 9/8042; H04N 19/86
    See application file for complete search history.

(56) References Cited

U.S. PATENT DOCUMENTS 5,754,436 A    5/1998   Walsh et al.
9,684,615 B1    6/2017   Nguyen et al.
(Continued)

FOREIGN PATENT DOCUMENTS

CN    104461970 A    3/2015
CN    111047036 A    4/2020
(Continued)

OTHER PUBLICATIONS

Wang Hongli, "Design and Implementation of Convolutional Neural Network Hardware Accelerator", China Excellent Master Dissertation Full Text Database Information Science and Technology Series, May 2020, Xiangtan University (69 pages).
(Continued)

*Primary Examiner* — Getente A Yimer
(74) *Attorney, Agent, or Firm* — Carter, DeLuca & Farrell LLP; David C. Lee

(57) ABSTRACT

A data moving method for a direct memory access apparatus is disclosed, and the data moving method for the direct memory access apparatus includes: receiving an object data moving instruction and decoding the object data moving instruction, by the direct memory access apparatus, in which the object data moving instruction includes an address domain and a control domain, the address domain of the object data moving instruction indicates address information of a segment of consecutive data in a plurality of segments of consecutive data, and the control domain of the object data moving instruction indicates control information for the address information of the segment of consecutive data; and executing, by the direct memory access apparatus, moving of the plurality of segments of consecutive data, according to the address information of the segment of consecutive data and the control information of the segment of consecutive data.

19 Claims, 12 Drawing Sheets

(56) References Cited

U.S. PATENT DOCUMENTS

| | | |
|---|---|---|
| 10,637,142 B1 | 4/2020 | Tran et al. |
| 11,409,685 B1 | 8/2022 | Kaplan et al. |
| 11,500,802 B1 | 11/2022 | Xu et al. |
| 11,669,473 B2 | 6/2023 | Vishnu et al. |
| 11,714,765 B2 | 8/2023 | Underwood et al. |
| 11,847,507 B1 | 12/2023 | Borkovic |
| 11,868,872 B1 | 1/2024 | Minkin et al. |
| 2002/0018598 A1* | 2/2002 | Maeda .................. G06T 9/007 382/251 |
| 2004/0093438 A1 | 5/2004 | Odom |
| 2006/0218313 A1 | 9/2006 | Haneda et al. |
| 2008/0126600 A1 | 5/2008 | Mitchell et al. |
| 2009/0287857 A1 | 11/2009 | Vu |
| 2011/0013696 A1* | 1/2011 | Hiramatsu ............ H04N 19/86 375/E7.193 |
| 2014/0040512 A1 | 2/2014 | Fernald |
| 2014/0112645 A1* | 4/2014 | Otani .................. H04N 9/8042 386/353 |
| 2014/0259149 A1 | 9/2014 | Circello et al. |
| 2017/0004101 A1 | 1/2017 | Shao |
| 2018/0025038 A1* | 1/2018 | Semlani ................ G06F 16/258 707/756 |
| 2018/0204111 A1 | 7/2018 | Zadeh et al. |
| 2019/0313251 A1* | 10/2019 | Michiels ................ H04W 12/04 |
| 2019/0347542 A1* | 11/2019 | Chen ......................... G06T 1/20 |
| 2020/0104167 A1* | 4/2020 | Chen .................... G06V 40/174 |
| 2020/0184278 A1 | 6/2020 | Zadeh et al. |
| 2020/0364088 A1 | 11/2020 | Ashwathnarayan et al. |
| 2021/0357742 A1 | 11/2021 | Restuccia et al. |
| 2022/0083486 A1 | 3/2022 | George et al. |
| 2022/0121884 A1 | 4/2022 | Zadeh et al. |

FOREIGN PATENT DOCUMENTS

| | | |
|---|---|---|
| CN | 112445431 A | 3/2021 |
| CN | 112765059 A | 5/2021 |

OTHER PUBLICATIONS

Final Office Action for U.S. Appl. No. 18/087,991 dated Jun. 21, 2024, 15 pages.

Office Action for U.S. Appl. No. 18/089,096, dated Aug. 27, 2024, 35 pages.

Non Final Office Action for U.S. Appl. No. 18/089,748 dated Jun. 6, 2024, 24 pages.

* cited by examiner

Input Feature Map

Filter

Output Feature Map

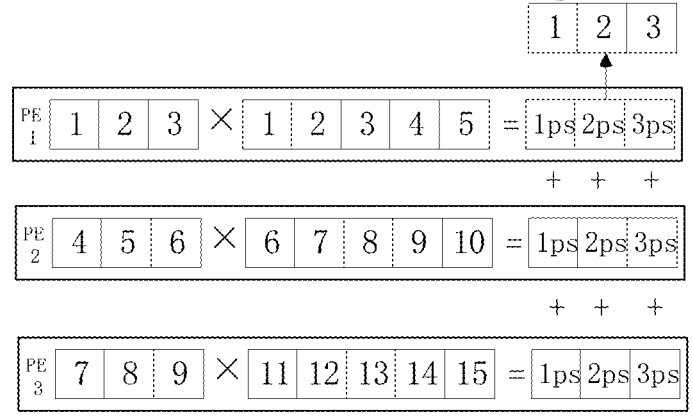
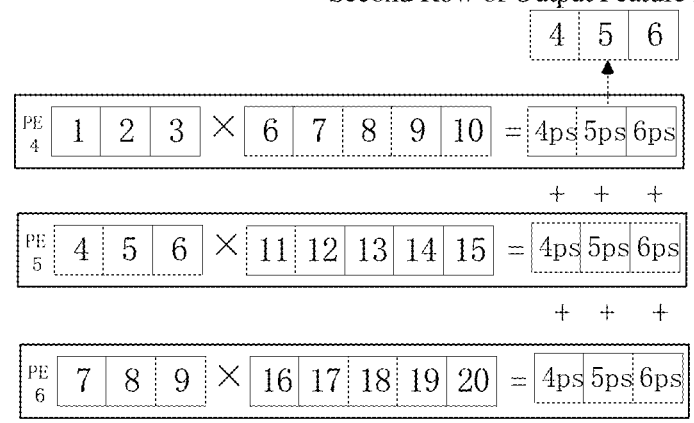
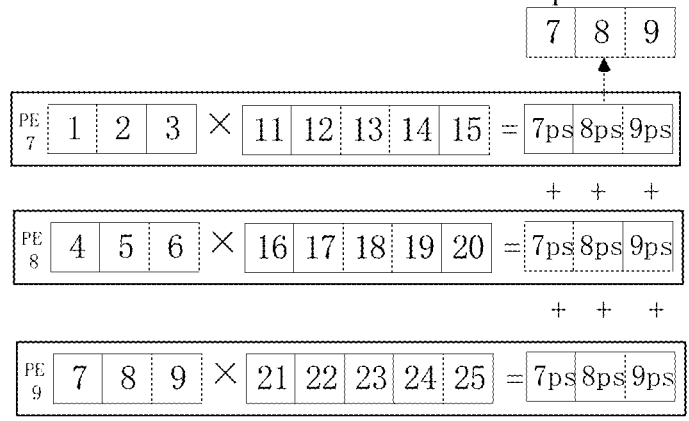
FIG. 5

R-type
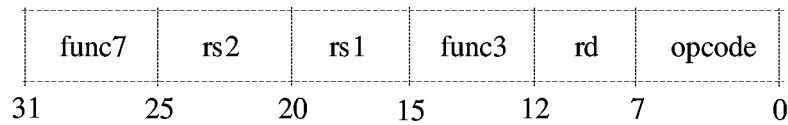
FIG. 10
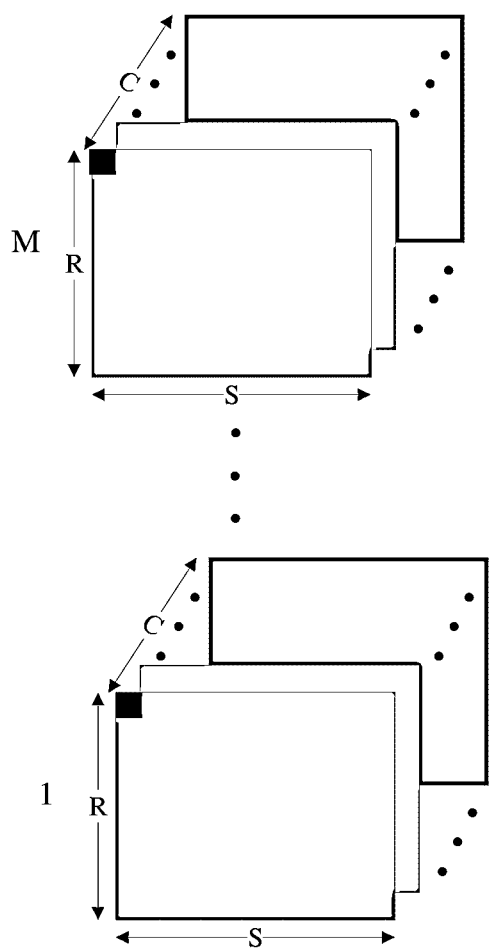
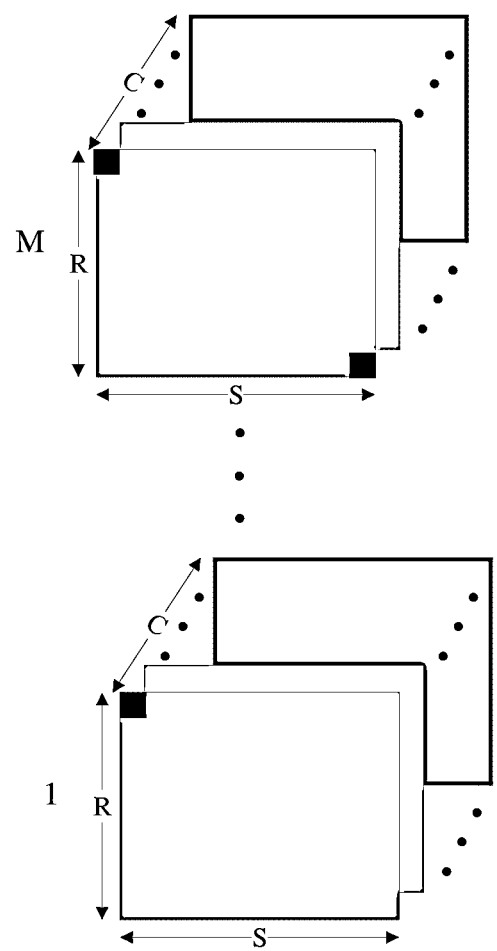
FIG. 11                                        FIG. 12

R-type

R-type

R-type

DATA MOVING METHOD FOR DIRECT MEMORY ACCESS APPARATUS

CROSS REFERENCE

The application claims priority to Chinese patent application No. 202111659145.9, filed on Dec. 30, 2021, the entire disclosure of which is incorporated herein by reference as part of the present application.

TECHNICAL FIELD

The present disclosure relates to a field of chips, and more specifically relates to a data moving method for a direct memory access apparatus, a non-volatile computer readable storage medium, and a non-volatile processor readable medium.

BACKGROUND

In a computer system, data exchange between an I/O device and a memory, and between a memory and a memory is usually required. The Direct Memory Access (DMA) technology is a high-speed data transmission mode, which allows direct data transmission between an external device and a memory, and between a memory and a memory. The DMA process is mainly implemented by hardware, and in this case, data exchange between an external device and a memory is not controlled by a Central Processing Unit (CPU), but is directly completed with a system bus controlled by a DMA hardware controller.

SUMMARY

According to a first aspect of the present disclosure, a data moving method for a direct memory access apparatus is proposed, and the data moving method includes: receiving an object data moving instruction and decoding the object data moving instruction, by the direct memory access apparatus, in which the object data moving instruction includes an address domain and a control domain, the address domain of the object data moving instruction indicates address information of a segment of consecutive data in a plurality of segments of consecutive data, and the control domain of the object data moving instruction indicates control information for the address information of the segment of consecutive data; and executing, by the direct memory access apparatus, moving of the plurality of segments of consecutive data, according to the address information of the segment of consecutive data and the control information of the segment of consecutive data.

According to a second aspect of the present disclosure, a non-volatile computer readable storage medium is proposed, a computer program for data moving of a direct memory access apparatus is stored on the non-volatile computer readable storage medium, the computer program, when run by a processor, causes the processor to execute a data moving method for the direct memory access apparatus, and the data moving method includes: receiving, by the direct memory access apparatus, an object data moving instruction and decoding the object data moving instruction, in which the object data moving instruction includes an address domain and a control domain, the address domain of the object data moving instruction indicates address information of a segment of consecutive data in a plurality of segments of consecutive data, and the control domain of the object data moving instruction indicates control information for the address information of the segment of consecutive data; and executing, by the direct memory access apparatus, moving of the plurality of segments of consecutive data, according to the address information of the segment of consecutive data and the control information of the segment of consecutive data.

According to a third aspect of the present disclosure, a non-volatile processor readable medium is proposed, instructions are stored on the non-volatile processor readable medium, the instructions are configured to cause a processor to execute a data moving method for a direct memory access apparatus, and the data moving method includes: receiving, by the direct memory access apparatus, an object data moving instruction and decoding the object data moving instruction, in which the object data moving instruction includes an address domain and a control domain, the address domain of the object data moving instruction indicates address information of a segment of consecutive data in a plurality of segments of consecutive data, and the control domain of the object data moving instruction indicates control information for the address information of the segment of consecutive data; and executing, by the direct memory access apparatus, moving of the plurality of segments of consecutive data, according to the address information of the segment of consecutive data and the control information of the segment of consecutive data.

The data moving method for the direct memory access apparatus, the non-volatile computer readable storage medium and the non-volatile processor readable medium provided by embodiments of the present disclosure can simplify a hardware structure of DMA and improve flexibility of a neural network data processing system.

BRIEF DESCRIPTION OF THE DRAWINGS

In order to more clearly illustrate the technical solutions of the embodiments of the present disclosure, the drawings that need to be used in description of the embodiments will be briefly described in the following. Apparently, the drawings in the following description are only some embodiments of the present disclosure. For those skilled in the art, other drawings can also be obtained based on these drawings without any inventive work. The following drawings are not deliberately scaled and drawn according to the actual size, and the emphasis is on illustrating the subject matter of the present disclosure.

FIG. 4 to FIG. 7 illustrate a schematic example of at least some PEs in a PE array executing a two-dimensional convolution operation;

FIG. 10 illustrates a schematic diagram of a structure of an R-type instruction in an RISC-V instruction set;

FIG. 11 conceptually illustrates illustration of offset address information according to the present disclosure;

FIG. 12 conceptually illustrates illustration of length information according to the present disclosure;

DETAILED DESCRIPTION

The technical solutions in the embodiments of the present disclosure will be described in a clearly and fully understandable way in conjunction with the drawings. Apparently, the described embodiments are only a part but not all of the embodiments of the present disclosure. Based on the embodiments of the present disclosure, those ordinarily skilled in the art can acquire other embodiment(s), without any inventive work, which should be within the scope of the present disclosure.

As shown in the present disclosure and claims, unless the context clearly indicates an exception, the words such as "a", "an" and/or "the" are not specific to singular, or may also include plural. In general, the terms "include" and "comprise" only suggest that steps and elements that are clearly identified are included, these steps and elements do not constitute an exclusive list, and the method or the device may also comprise other steps or elements.

Although the present disclosure makes various references to certain modules in the system according to the embodiments of the present disclosure, any number of different modules may be used and run on a user terminal and/or a server. The modules are merely illustrative, and different aspects of the system and the method may use different modules.

The flow chart is used in the present disclosure to illustrate the operations executed by the system according to the embodiments of the present disclosure. It should be understood that, preceding or following operations are not necessarily executed precisely in order. Instead, the respective steps may be processed in a reverse order or at a same time as needed. Meanwhile, other operations may also be added to these processes, or a certain step or several steps may be removed from these processes.

Neural network is a mathematical computational model inspired by the structure of brain neurons and the principle of neural conduction. The method to achieve intelligent computing based on this kind of model is called brain-inspired computing. For example, neural networks include various forms of network structures, such as back propagation (BP) neural networks, convolutional neural networks (CNN), recurrent neural networks (RNN), long short-term memory networks (LSTM), etc. For example, convolutional neural networks may also be subdivided into fully convolutional networks, deep convolutional networks, U-shaped networks (U-Net), etc.

Figures 1, 2:
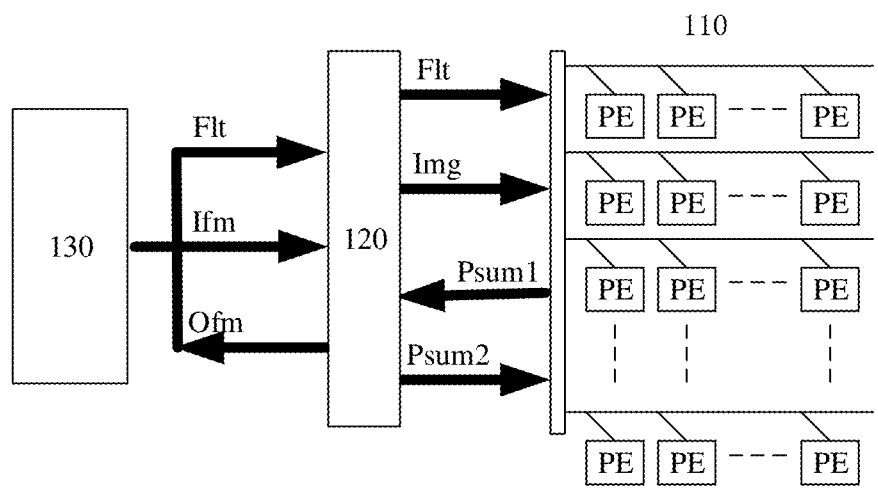
FIG. 1 illustrates a schematic example of a convolution operation by using a 2×2 filter.
FIG. 2 illustrates a schematic diagram of an architecture of a neural-network processor.

A convolution operation of a neural network is to perform a matrix inner product on an input feature map and a filter/convolution kernel. FIG. 1 illustrates a schematic example of a convolution operation by using a 2×2 filter. As illustrated in FIG. 1, the size of a filter F is a matrix of 2×2, the size of an input feature map X is a matrix of 3×3, the input feature map X and the filter F perform the convolution operation to obtain an output feature map O, and the size of the output feature map O is a matrix of 2×2, then the convolution operation result of the output feature map O is as follows:

$$O11 = F11X11 + F12X12 + F21X21 + F22X22,$$

$$O12 = F11X12 + F12X13 + F21X22 + F22X23,$$

$$O21 = F11X21 + F12X22 + F21X31 + F22X32,$$

$$O22 = F11X22 + F12X23 + F21X32 + F22X33.$$

Due to the amount of computation of neural networks, especially for convolutional layers with a large-sized input feature map, is very large, it is usually necessary to decompose the computational operation of a convolutional layer in a neural network. For example, the convolutional operations of different parts of the same convolutional layer may be performed independently of each other, and these decomposed tasks are computed in parallel by multiple processing units, and then computation results of these processing units are combined to obtain the computation result of the entire convolutional layer. Then the computation result of the convolutional layer may be served as an input of the next convolutional layer.

Neural-network Processing Unit (NPU) is a class of microprocessors or computing systems dedicated to hardware acceleration of artificial intelligence (especially artificial neural networks, machine vision, machine learning, etc.), sometimes referred to as AI Accelerator.

FIG. 2 illustrates a schematic diagram of an architecture of a neural-network processor (or processing unit), for example, a neural-network processor of an Eyeriss architecture. As illustrated in FIG. 2, the neural-network processor includes a processing unit (or a processing element, PE) array 110, a global cache 120 and a memory 130. The processing unit array 110 includes multiple rows and columns (e.g., 12 rows×12 columns) of processing units that are coupled to each other through an on-chip interconnect and share a global cache 120, and the on-chip interconnect is, for example, a network on chip (NoC). Each processing unit has a computing function and may also have, for example, its own local cache, such as a cache or register array including a multiply-accumulator (MAC) and a vector (or matrix) for buffering the inputs. Each PE can access other PEs around it, the PE's own local cache and the global cache. The global cache 120 is further coupled to the memory 130 through, for example, a bus.

In the working process, for example, the data of the convolution kernel (Flt), the input feature map (Ifm), etc. required for computation of a network layer (e.g., a convolutional layer) is read from the memory 130 into the global cache 120, and then from the global cache 120, the convolution kernel (Flt) and the input image (Img) are input to the processing unit array 110 for computation, and the computation tasks for different image pixels are allocated to different processing units (i.e., for mapping). The partial accumulated sum (Psum1) generated during the computation process is temporarily stored in the global cache, and if the partial accumulated sum (Psum1) generated previously is required for further accumulated operation in subsequent computation, the required partial accumulated sum (Psum2) may be read from the global cache 120 into the processing unit array 110 for operation. The output feature map (Ofm) obtained by completing the operation of one convolutional layer may be output from the global cache 120 to the memory 130 for storage, for example, the output feature map may be used for the computation of the next network layer (e.g., a convolutional layer).

For example, for the data generated by the processing unit array 110, especially in the case of sparse matrices, these data may be compressed and stored; a compression method for sparse matrices is RLC encoding, which can save storage space by encoding consecutive zeros into the number of zeros. During the process of storing data from the processing unit array 110 into the memory 130, an encoder may be used to compress and encode the data; correspondingly, during the process of reading data from the memory 130 into the processing unit array 110, a decoder may be used to decompress the data.

Figure 3:
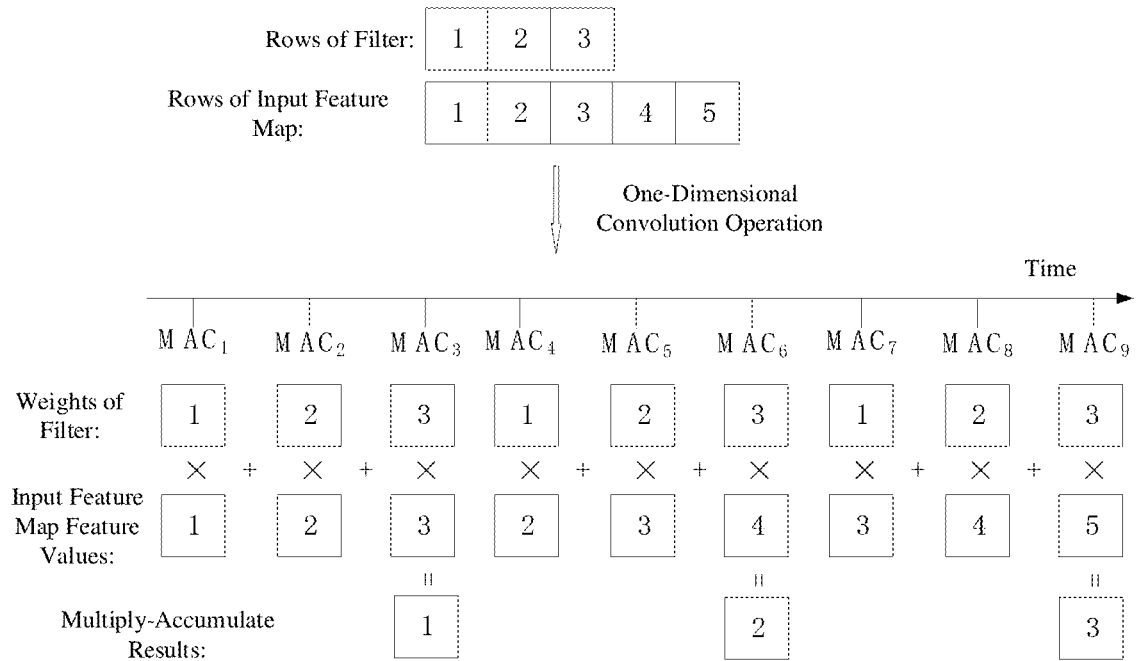
FIG. 3 illustrates a schematic example of a single PE (processing element or processing unit) executing a one-dimensional convolution operation.

FIG. 3 illustrates a schematic example of a single PE executing a one-dimensional convolution operation. As illustrated in FIG. 3, a row of the filter and a row of the input feature map are one-dimensional vectors. During the process of the convolution operation, the filter weight remains unchanged, a window of the input feature map is slid, then the multiply-accumulate operation is performed through the multiplier/adder (MAC) sequentially to obtain multiply-accumulate result, and the output feature map may be obtained by reorganizing the multiply-accumulate result.

Figure 4:
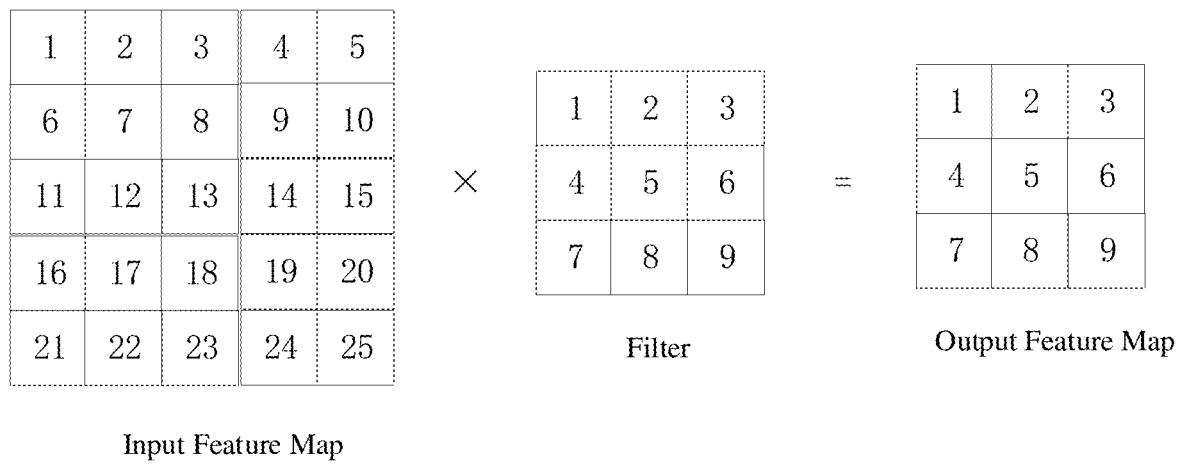

FIG. 4 to FIG. 7 illustrate a schematic example of at least some PEs in a PE array executing a two-dimensional convolution operation. As illustrated in FIG. 4, a convolution operation is executed on an input feature map with a size of 5×5 and a filter with a size of 3×3 to obtain an output feature map with a size of 3×3. In the example of the convolution operation illustrated in FIG. 4, the number of rows of the input feature map is 5, the number of rows of the filter is 3, and the number of rows of the output feature map is 3, so a PE array with a size of 3×3 may be adopted for executing the convolution operation illustrated in FIG. 4.

As illustrated in FIG. 5, each PE in the PE array of 3×3 may execute a one-dimensional convolution operation as illustrated in FIG. 3. PE 1, PE 2 and PE 3 are a first row of the PE array of 3×3, and filter weights in PE 1, PE 2 and PE 3 are respectively a first row, a second row, and a third row of the filter. Input feature map feature values in PE 1, PE 2 and PE 3 are respectively a first row, a second row, and a third row of the input feature map; a multiply-accumulate result in PE 3 is accumulated to a multiply-accumulate result in PE 2, the multiply-accumulate result in PE 2 is accumulated to a multiply-accumulate result in PE 1, and finally a first row of the output feature map is obtained. PE 4, PE 5 and PE 6 are a second row in the PE array of 3×3; filter weights in PE 4, PE 5 and PE 6 are respectively the first row, the second row, and the third row of the filter, input feature map feature values in PE 4, PE 5 and PE 6 are respectively the second row, the third row, and a fourth row of the input feature map; a multiply-accumulate result in PE 6 is accumulated to a multiply-accumulate result in PE 5, the multiply-accumulate result in PE 5 is accumulated to a multiply-accumulate result in PE 4, and finally a second row of the output feature map is obtained. PE 7, PE 8 and PE 9 are a third row in the PE array of 3×3, filter weights in PE 7, PE 8 and PE 9 are respectively the first row, the second row, and the third row of the filter, input feature map feature values in PE 7, PE 8 and PE 9 are respectively the third row, the fourth row, and a fifth row of the input feature map, a multiply-accumulate result in PE 9 is accumulated to a multiply-accumulate result in PE 8, and the multiply-accumulate result in PE 8 is accumulated to a multiply-accumulate result in PE 7, and finally a third row of the output feature map is obtained.

Figure 6:
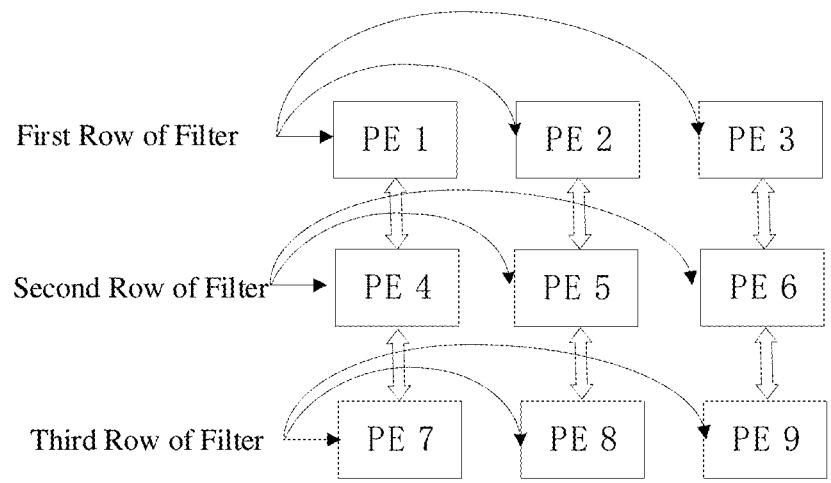
Figure 7:
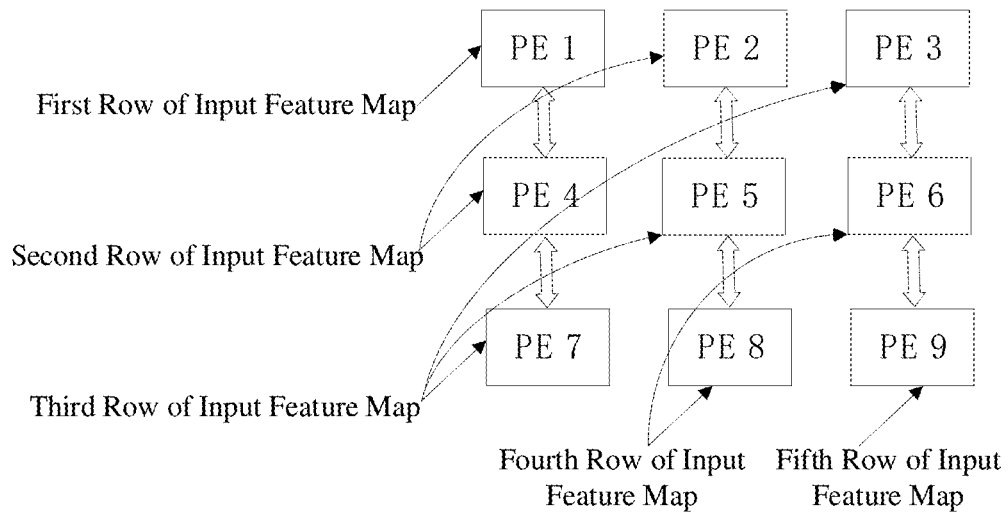

FIG. 6 and FIG. 7 respectively schematically illustrate the reuse mode of the filter weights and the input feature map feature values during the process when the PE array of 3×3 executes the convolution operation. As illustrated in FIG. 6, the first row, the second row and the third row of the filter weights are sequentially reused horizontally respectively in the first row, the second row and the third row of the PE array of 3×3. As illustrated in FIG. 7, the second row of the input feature map feature values is reused between PE 4 and PE 2 that is in a diagonal position of PE 4, the third row of the input feature map feature values is reused between PE 7 and PE 5 and PE 3 that are in a diagonal position of PE 7, and the fourth row of the input feature map feature values is reused between PE 8 and PE 6 that is in a diagonal position of PE 8.

It may be seen from the above description that in the PE array of the neural-network processor of the Eyeriss architecture, by reusing the rows of the filter weights horizontally between PEs, and reusing the rows of the input feature map feature values between the diagonals of PEs, a Row Stationary (RS) data flow is implemented. In addition, it may be seen from the above description that in the row stationary data flow, one row of the input feature map feature values and one row of the filter weights have a mapping relationship with at least one PE in the PE array. For example, as illustrated in FIG. 6 and FIG. 7, the first row of the input feature map feature values and the first row of the filter weights have a mapping relationship with PE 1, and the second row of the input feature map feature values and the second row of the filter weights have a mapping relationship with PE 4. For convenience of description, the above-described mapping relationship may be recorded herein as a mapping relationship of an input feature map or a mapping relationship of a filter or a mapping relationship of a weight.

Figure 8:
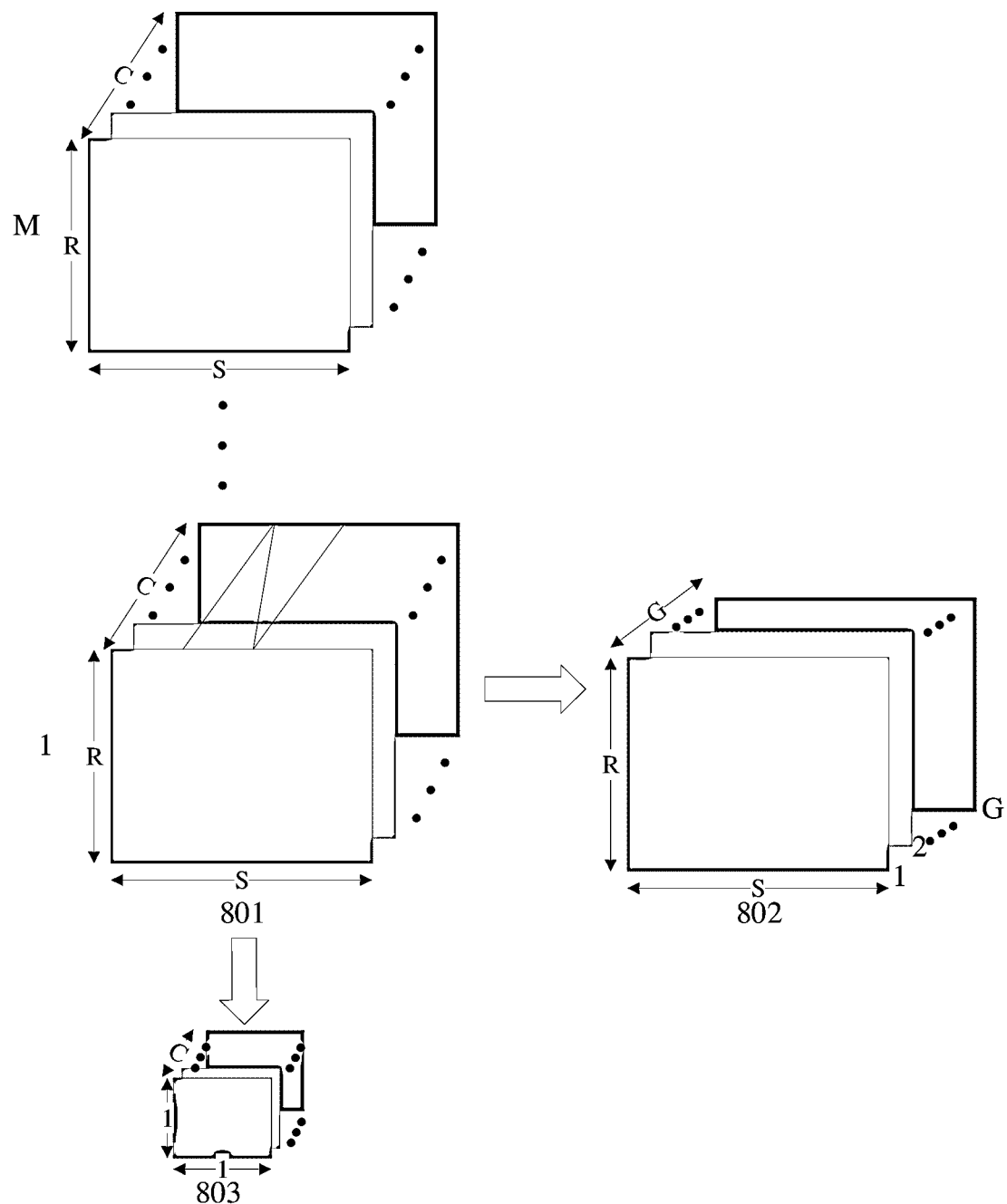
FIG. 8 and FIG. 9 illustrate schematic examples of some methods for cutting a filter.
Figure 9:
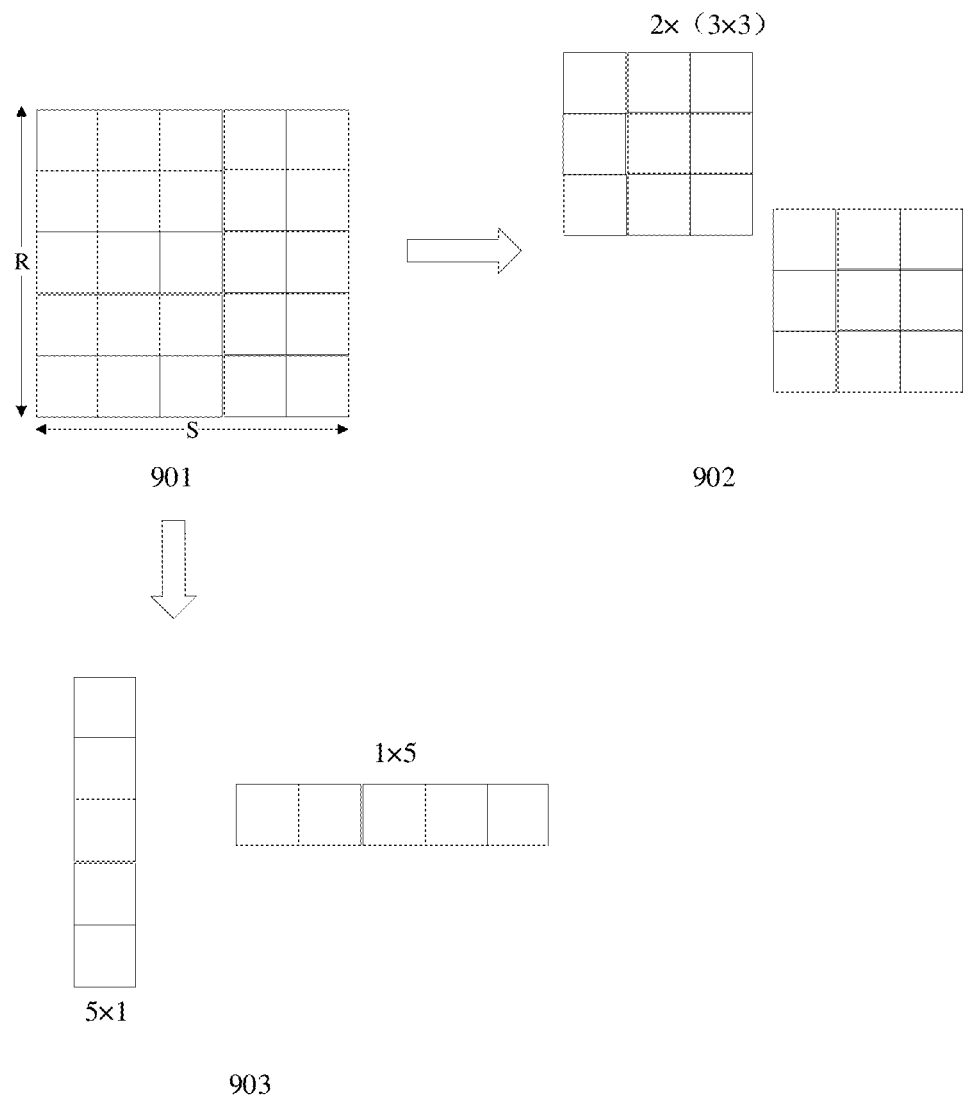

In order to implement the row stationary data flow as described in the present disclosure, a solution proposes to cut the input feature map and the filter, and FIG. 8 and FIG. 9 illustrate schematic examples of some methods for cutting a filter. 801 in FIG. 8 illustrates a filter, which includes four dimensions, namely height, length, channel and quantity. A single filter has a height as R, a length as S, the number of channels as C, and the quantity of filters is M. 802 in FIG. 8 illustrates a method for cutting the filter. As illustrated in 802, a channel C of a first filter may be split into at least one channel group, and the number of channels in the channel group is G, where G<C. 803 in FIG. 8 illustrates another method for cutting the filter, as illustrated in 803, filters are split one by one based on a single weight in height and length dimensions of the first filter, while the number of channels of each filter split is still C. 901 in FIG. 9 illustrates a two-dimensional filter, which includes two dimensions: height R and length S, and the size of the filter is 5×5. 902 in FIG. 9 illustrates a method for cutting the filter. As illustrated in 902, the filter of 5×5 may be cut based on two filters of 3×3. 903 in FIG. 9 illustrates another method for cutting the filter, as illustrated in 903, the filter of 5×5 may be cut based on a filter of 1×5 or a filter of 5×1.

Some algorithms may be used for cutting the data of the input feature map or the filter, and some data of the cut input feature map or the filter has the mapping relationship of the input feature map or the filter as described herein.

Direct Memory Access (DMA) refers to an interface technology of direct data interaction with a system memory without a Central Processing Unit (CPU), and is usually used for moving data in a computer system. In the present disclosure, a hardware structure for implementing a DMA process may be referred to as a direct memory access apparatus or a DMA apparatus; and for convenience of description, the DMA apparatus and the DMA may be used interchangeably. The data of the filter or the input feature map is usually stored in a memory in a consecutive manner; for example, a storage mode of the first filter 801 in FIG. 8 is as follows: firstly, data is stored sequentially in a channel direction (e.g., from $C_0$ to $C_n$), then is stored sequentially in a length direction (e.g., from $S_0$ to $S_n$), to form "Z" shaped consecutive storage illustrated in diagram, and finally is stored sequentially in a height direction (e.g., from $R_0$ to $R_n$).

In some neural-network processor (or Neural-Network Processing Unit, NPU) systems of a row stationary data flow (e.g., the above-described neural-network processor of the Eyeriss architecture), the DMA needs to move data according to the mapping relationship of the input feature map or the filter. Some algorithms may be used to cut the data of the input feature map or the filter on respective dimensions, and data obtained is usually inconsecutive, so the data obtained has a complex mapping relationship of the input feature map or the filter. If the mapping relationship of the input feature map or the filter is parsed by the DMA, and the data of the input feature map or the filter is moved according to the parse result, a more complex DMA hardware structure is required to execute the parse function.

In order to solve the above-described technical problem, the present disclosure proposes an instruction solution for controlling the DMA based on a coprocessor; the coprocessor executes some algorithms to cut the data of the input feature map or the filter and output an instruction; some data of the input feature map or the filter having been cut has a mapping relationship of the input feature map or the filter; and the DMA decodes the instruction output by the coprocessor and moves the data according to a decoding result, thereby simplifying the hardware structure of the DMA and improving flexibility of the neural-network processor (e.g., RS NPU) system.

A structure and a combination of instructions according to the present disclosure will be described below with reference to FIG. 10 to FIG. 17.

An RISC-V instruction set is an open-source instruction set architecture based on a Reduced Instruction Set Computing (RISC) principle. FIG. 10 illustrates a schematic diagram of a structure of an R-type instruction (also referred to as a register type instruction) in the RISC-V instruction set. As illustrated in FIG. 10, a domain of the R-type instruction is 32 bits, including 7-bit opcode, 5-bit rd, 3-bit func3, 5-bit rs1, 5-bit rs2, and 7-bit func7, where opcode indicates an operation code, rd indicates a number of a destination register, func3 is an expandable operation code/function code, rs1 indicates a number of a first source register, rs2 indicates a number of a second source register, and func7 is an expandable operation code/function code.

In the RISC-V instruction set, opcode is used to indicate a type of an instruction, and opcode of the R-type instruction is a fixed value [0110011]. The func3 in the R-type instruction is used to indicate different functions of the R-type instruction, and these functions include address, logic, operation, etc., and func3 of the R-type instruction that indicates address is a fixed value [000].

In the present disclosure, opcode and func3 may indicate that the instruction type is the R-type instruction and that the instruction is a data moving instruction that indicates an address. For convenience of description, the instruction whose function is to indicate an address may be interchanged with the data moving instruction, for example, the instruction whose function indicated by func3 is an address may be interchanged with the data moving instruction.

In the present disclosure, some bits (e.g., three bits) in func7 of the R-type instruction may be used to encode the type of the data moving instruction. In an example, three bits in func7 of the R-type instruction may be used to encode five types of data moving instruction below:
- ①: Request for uncompressed data of the input feature map;
- ②: Request for uncompressed data of the filter;
- ③: Request for compressed data of the filter;
- ⑤: Reading the credit number (significand) of requests for the data of the input feature map;
- ⑤: Reading the credit number of requests for the data of the filter.

Exemplarily, coding for the above-described five types of the data moving instructions are as follows:

| Types of the data moving instruction | ① | ② | ③ | ④ | ⑤ |
|---|---|---|---|---|---|
| Codes | 100 | 110 | 111 | 010 | 011 |

In the present disclosure, a process of the DMA parsing the data moving instruction and executing the data moving instruction according to the parsed information is referred to as the DMA executing the data moving instruction, and the data moving instruction is referred to as an object data moving instruction. For example, ①, ② and ③ here are object data moving instructions. As will be described later in the present disclosure, the DMA executing the object data moving instruction may implement moving of data (e.g., the data of the input feature map or the filter), and may also implement moving of an instruction (e.g., a second type instruction to be described later in the present disclosure). That is, the data moving instructions may implement moving of different objects, including both data and instructions.

In the present disclosure, the 5-bit rs1, rs2 and rd in the data moving instruction respectively indicate addresses of the first source register, the second source register, and the destination register. In the present disclosure, at least one of the first source register, the second source register, and the destination register may use at least some bits to encode information associated with DMA data moving according to the mapping relationship of the input feature map or the filter.

For convenience of description, the DMA performing data moving according to the mapping relationship of the input feature map or the filter is briefly referred to as data moving herein.

In one example, a first source register with a length of 32 bits may be used to encode address information of data to be moved during data moving. In the present disclosure, the address information of the data to be moved may include base address information and offset address information. FIG. 11 conceptually illustrates illustration of the offset address information according to the present disclosure. As illustrated in FIG. 11, four dimensions of a filter are respectively length R, width S, channel C, and quantity M, the base address information may be address information of a first weight in the filter (as illustrated by a "black box" in an upper left corner of a 1st channel of a 1st filter in FIG. 11) in a memory, and the memory here may be either a Dynamic Random Access Memory (DRAM) or a Static Random Access Memory (SRAM). If weight data to be moved is data of a 1st channel of an Mth filter, the offset address information may be address information of a first weight in weights to be moved in the filter (as illustrated by a "black box" in an upper left corner of a 1st channel of the Mth filter in FIG. 11) in the memory, and the offset address information may indicate offset information of the first weight in the weights to be moved in the filter relative to a weight at a base address.

In another example, the base address information of the data to be moved may be preset address information (e.g., configured by software), and the offset address information of the data to be moved may be obtained by the coprocessor executing some algorithms, so that the first source register may use at least some bits to encode the offset address information without encoding the base address information, thereby simplifying the encoding mode, and improving decoding efficiency of the DMA for the data moving instructions. Exemplarily, modes of encoding the offset address information of the five types of data moving instructions as described in the present disclosure by using the first source register are as follows:

| Types of data moving instructions | ① | ② | ③ | ④ | ⑤ |
|---|---|---|---|---|---|
| Modes of encoding | Using 32 bits to encode offset address | Using 32 bits to encode offset address | Using 32 bits to encode offset address | None | None |

In one example, at least some bits of the second source register may be used to encode other information associated with data moving other than the address information of the data to be moved as described above. Exemplarily, some bits (e.g., 13 bits) in the 32-bit second source register may be used to encode the length information of the data to be moved.

FIG. 12 conceptually illustrates illustration of length information according to the present disclosure. As illustrated in FIG. 12, if the weight data to be moved is the data of the 1st channel of the Mth filter, the length information is a length of the data of the 1st channel of the Mth filter in the memory, and the length information may be reflected as the length of the data of the 1st channel of the Mth filter, that is, the length information of the first weight and the last weight of the weight data to be moved (as illustrated by a "black box" in a lower right corner of the 1st channel of the Mth filter in FIG. 12).

Exemplarily, modes of encoding the length information of the five types of the data moving instructions as described in the present disclosure by using some bits in the second source register are as follows:

| Types of data moving instructions | ① | ② | ③ | ④ | ⑤ |
|---|---|---|---|---|---|
| Modes of encoding | Using 13 bits to encode length | Using 13 bits to encode length | Using 13 bits to encode length | None | None |

In another example, at least some bits of the second source register may be used to encode Identification Information (ID) of the DMA executing the data moving instruction. In the NPU system of the row stationary data flow, a plurality of DMAs may be used to execute tasks of data moving, for example, a first task of data moving may be executed by a first DMA, and a second task of data moving may be executed by a second DMA, and so on.

Exemplarily, modes of encoding the DMA IDs of the five types of the data moving instructions as described in the present disclosure by using some bits in the second source register are as follows:

| Types of data moving instructions | ① | ② | ③ | ④ | ⑤ |
|---|---|---|---|---|---|
| Modes of encoding | Using 5 bits to encode DMA ID | Using 5 bits to encode DMA ID | Using 5 bits to encode DMA ID | Using 5 bits to encode DMA ID | Using 5 bits to encode DMA ID |

In another example, at least some bits of the second source register may be used to encode channel information in the DMA executing the data moving instruction. The channel information of the DMA according to the present disclosure will be illustrated below with reference to FIG. 13.

Figure 13:
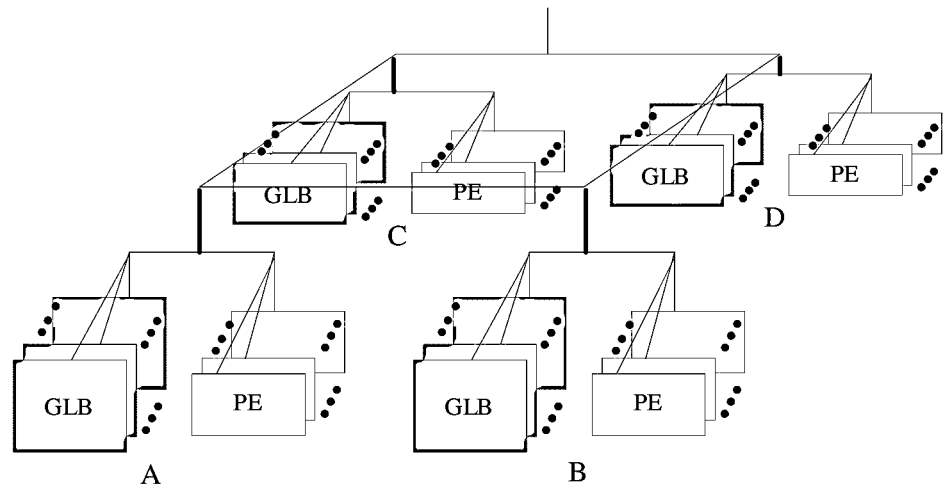
FIG. 13 conceptually illustrates illustration of channel information of DMA according to the present disclosure.

Eyeriss V2 is a neural-network processor of the row stationary data flow, and proposes an architecture as illustrated in FIG. 13. As illustrated in FIG. 13, Eyeriss V2 includes a plurality of Global Buffers (GLBs) and a plurality of PEs; each GLB is configured to store data or an instruction moved by the DMA by executing a data moving instruction; each PE is configured with a GLB; and the PEs and the GLBs are connected with each other through a 2D mesh network. When the DMA executes the data moving instruction, the data or the instruction moved may be stored in different GLBs or GLB clusters. For example, the data or the instruction moved may be stored in a GLB cluster at A in FIG. 13, or may also be stored in a GLB cluster at B in FIG. 13; or, the data or the instruction moved may be stored in a first GLB in the GLB cluster at A, or may also be stored in a second GLB in the GLB cluster at A. For convenience of description, the GLB or the GLB cluster that can store the data or the instruction moved is hereinafter briefly referred to as GLB. In the example, when the DMA executes the data moving instruction, the data or the instruction moved may be stored in different GLBs, and data channels corresponding thereto in the DMA may also be different. For example, the data or the instruction moved may be stored in 8 different GLBs, and the DMA may include 8 data channels corresponding to the 8 GLBs. The data channel here may be a channel of the DMA as described above in the present disclosure.

Exemplarily, modes of encoding channel information of the five types of the data moving instructions as described in the present disclosure by using some bits in the second source register are as follows:

| Types of data moving instructions | ① | ② | ③ | ④ | ⑤ |
|---|---|---|---|---|---|
| Modes of encoding | Using 4 bits to encode channel ID | Using 4 bits to encode channel ID | Using 4 bits to encode channel ID | None | None |

In another example, at least some bits of the second source register may be used to encode cutting status information of the data to be moved in data moving.

Figure 14:
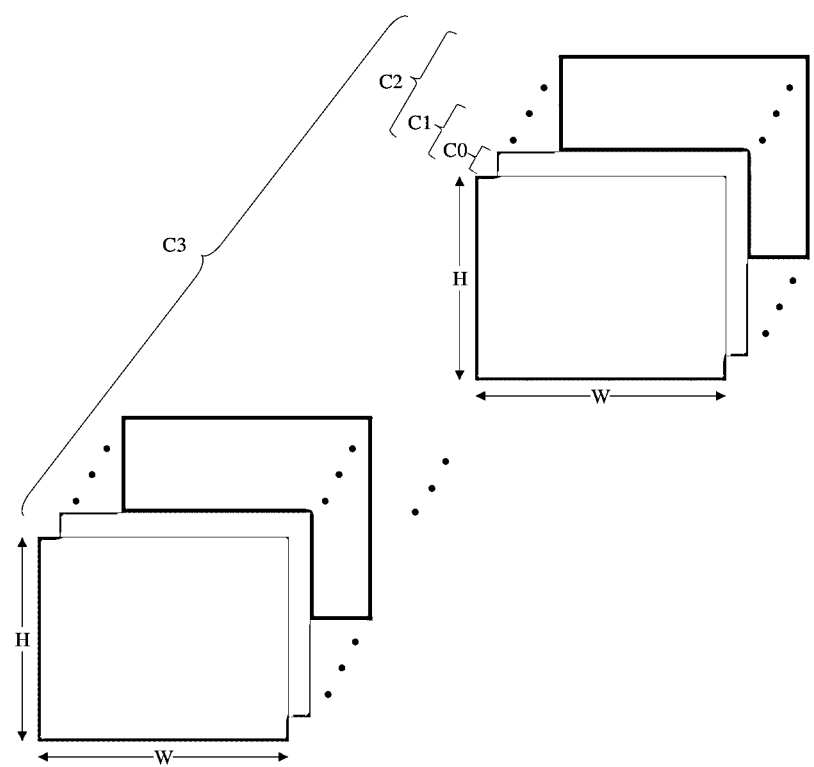
FIG. 14 conceptually illustrates illustration of cutting status information of data to be moved according to the present disclosure.

The cutting status information of the data to be moved according to the present disclosure will be illustrated below with reference to FIG. 14. As illustrated in FIG. 14, on the channel dimension of the input feature map, "C0" represents a range of cutting for data moving of a PE, "C1" represents a range of cutting for data moving of a PE cluster, "C2" represents a range of cutting for data moving of a GLB, and 'C3" represents a range of cutting for a task of this data moving. In the present disclosure, data to be moved for a task of one data moving may be original data, for example, all input feature map data before cutting illustrated in FIG. 14 may be original data. Cutting of the input feature map on other dimensions is similar to the cutting on the channel dimension illustrated in FIG. 14, and cutting of the output feature map and the filter on respective dimensions are similar to cutting of the input feature map on respective dimensions, and no details will be repeated here. The cutting status information according to the present disclosure may be information of the last cutting on at least one dimension for the data to be moved. For example, codes of information of the last cutting (recorded as _last) on a plurality of dimensions by using 4 bits in the second source register are as follows:

| Dimensions | Input feature map channel_ last | Output feature map width_last | Batch size of feature map_last | Output feature map length_last | Channel group_ last | Filter quantity_ last |
|---|---|---|---|---|---|---|
| Codes | 0000 | 0001 | 0010 | 0011 | 0100 | 0101 |

In another example, at least some bits of the second source register may be used to encode operation information of the data to be moved in data moving. In the present disclosure, the operation information for the data to be moved may be information for executing an operation on the data to be moved so that the data after the operation is adapted to an operation of the neural network, before data moving is executed on the data to be moved. In one example, the operation information for the data to be moved may be information of a padding operation. Exemplarily, codes of the information of the padding operation by using 4 bits in the second source register are as follows:

| Operation information | Padding left side only | Padding right side only | Padding left side and right side | Padding rows |
|---|---|---|---|---|
| Codes | 0001 | 0010 | 0011 | Numerical values represented by 4 bits |

In another example, at least some bits of the second source register may be used to jointly encode the cutting status information and the operation information of the data to be moved in data moving.

In the example, some bits of the second source register may be taken as an identification code of the cutting status information and the operation information. For example, 8 bits of the second source register are used to jointly encode the cutting status information and the operation information, high-order 4 bits are taken as the identification code of the cutting status information and the operation information, and low-order 4 bits are taken as the code of the cutting status information or the operation information. For example, codes for jointly encoding the cutting status information and the operation information of the data to be moved in data moving by using 8 bits in the second source register are as follows:

| Information types | Identification code | Information codes |
|---|---|---|
| Input feature map channel_last | 0010 | 0000 |
| Output feature map width_last | 0010 | 0001 |
| Batch size of feature map_last | 0010 | 0010 |
| Output feature map length_last | 0010 | 0011 |
| Channel group_last | 0010 | 0100 |
| Filter quantity_last | 0010 | 0101 |
| Padding left side only | 0011 | 0001 |
| Padding right side only | 0011 | 0010 |
| Padding left side and right side | 0011 | 0011 |
| Padding rows | 0100 | Numerical values represented by 4 bits |

In another example, at least some bits of the second register are used to encode moving status information in data moving.

In the example, the moving status information may be moving status information for some data in the data to be moved, or may also be moving status information for all data in the data to be moved. For example, the moving status information may include information that data moved to the GLB has been completed, or may also include information that a task of data moving has been completed. In the example, 4 bits of the second register may be used to encode the moving status information; for example, the information that the data moved to the GLB has been completed and/or the information that the task of data moving has been completed may be encoded as 0001.

In yet another example, at least some bits of the second source register may be used to jointly encode a plurality of pieces of moving status information.

In the example, some bits of the second source register may be taken as identification codes of the respective pieces of moving status information. For example, 2 bits therein of the second source register may be taken as identification codes of first moving status information (e.g., information that the data moved to the GLB has been completed) and second moving status information (e.g., information that the task of data moving has been completed). Preferably, fields of an ACMD FLAG domain in the R-type instruction may be used to encode the identification information of the first moving status information and the second moving status information. Exemplarily, codes for jointly encoding the first moving status information and the second moving status information by using 6 bits in the second source register are as follows:

| Information types | Identification codes | Information codes |
|---|---|---|
| First moving status information | ACMD FLAG: 10 | 0001 |
| Second moving status information | ACMD FLAG: 01 | 0001 or 0 × 1 |

In one example, at least some bits of the destination register may be used to encode the credit number of requests for data of the input feature map or the credit number of requests for data of the filter. In the example, the credit number of requests for data may be the number of requests for data. For example, if the credit number is 5, it indicates that there are 5 requests for data.

Exemplarily, codes for encoding the credit number as described in the present disclosure by using at least some bits in the destination register are as follows:

| Types of data moving instructions | ① | ② | ③ | ④ | ⑤ |
|---|---|---|---|---|---|
| Modes of encoding | None | None | None | Using 32 bits to encode credit number | Using 32 bits to encode credit number |

Figure 15:
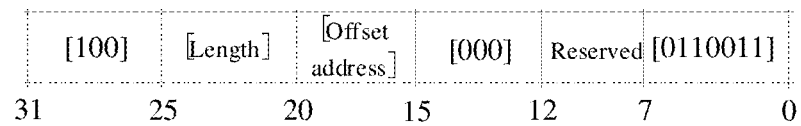
FIG. 15 illustrates an example of a first type instruction according to the present disclosure.
Figure 16:
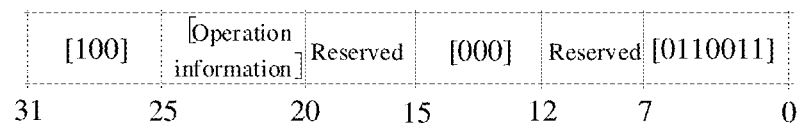
FIG. 16 illustrates an example of a second type instruction according to the present disclosure.
Figure 17:
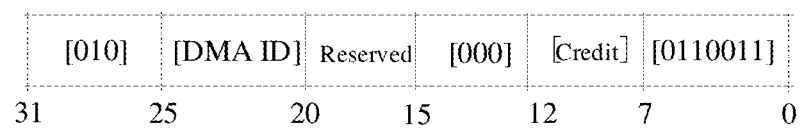
FIG. 17 illustrates an example of a third type instruction according to the present disclosure.

The above-described content has illustrated the structure and combined encoding modes of the instructions according to the present disclosure in conjunction with FIG. 10 to FIG. 14, and the following will continue to illustrate functions of the instructions according to the present disclosure in conjunction with FIG. 15 to FIG. 17.

The instructions according to the present disclosure include data moving instructions for executing moving on data to be moved and data moving instructions for executing moving on control information. For convenience of description, in the present disclosure, the data moving instruction for executing moving on the data to be moved is recorded as a first type instruction, and the data moving instruction for executing moving on the control information is recorded as a second type instruction.

FIG. 15 illustrates an example of the first type instruction according to the present disclosure. As illustrated in FIG. 15, the instruction is an R-type instruction (indicated by opcode being a fixed value [0110011]), the instruction is a data moving instruction (indicated by func3 being a fixed value [000]), and the type of the data moving instruction corresponding to the instruction is (1 (indicated by a code of func7 according to the present disclosure). At least some bits in the first source register of the instruction indicate offset address information of the data to be moved, and at least some bits in the second source register of the instruction indicate length information of the data to be moved. In an optional example, the first type instruction may further include at least one of the code of the identification information of the DMA and the code of the channel information in the DMA as described above in the present disclosure. Exemplarily, in the first type instruction illustrated in FIG. 15, at least some bits in the second source register may indicate the identification information of the DMA and/or the channel information in the DMA.

FIG. 16 illustrates an example of the second type instruction according to the present disclosure. As illustrated in FIG. 16, the instruction is an R-type instruction (indicated by opcode being a fixed value [0110011]), the instruction is a data moving instruction (indicated by func3 being a fixed value [000]), and the type of the data moving instruction corresponding to the instruction is ① (indicated by the code of func7 according to the present disclosure). A first source register of the instruction no longer indicates the offset address information of the data to be moved, and a second source register of the instruction no longer indicates the length information of the data to be moved. At least some bits in the second source register of the instruction indicate the operation information of the data to be moved as described above in the present disclosure. In an optional example, the second type instruction may further include at least one of the code of the cutting status information and the code of one or more pieces of moving status information of the data to be moved as described above in the present disclosure. Exemplarily, in the second type instruction illustrated in FIG. 16, at least some bits in the second source register may indicate the cutting status information and/or one or more pieces of moving status information of the data to be moved.

In an optional example, at least some bits of the second source registers in the first type instruction and the second type instruction according to the present disclosure may be used to encode priorities of the first type instruction and the second type instruction. In the example, priorities of instructions indicate an order in which the instructions are sent, an instruction with a higher priority has a higher sending order, and an instruction with a lower priority has a lower sending order. In the example, the second type instruction including the code of the operation information of the data to be moved as described above in the present disclosure and the second type instruction including the code of the cutting status information of the data to be moved as described above in the present disclosure are in a first order of priority, the first type instructions according to the present disclosure are in a second order of priority, and the second type instruction including the code of one or more pieces of moving status information as described above in the present disclosure are in a third order of priority.

In an optional example, the first type instruction may include a code indicating moving status information. For example, the first type instruction may include the code of the first moving status information as described above in the present disclosure. In order to discriminate a first type instruction including a code indicating moving status information from a first type instruction excluding a code indicating moving status information, discrimination information may be encoded. Exemplarily, the discrimination information may be encoded by using 4 bits of the second source register; for example, the first type instruction including the code indicating the moving status information may be encoded as 0010, and the first type instruction excluding the code indicating the moving status information may be encoded as 0001. Optionally, the priority of the first type instruction including the code indicating the moving status information is lower than the priority of the first type instruction excluding the code indicating the moving status information.

The instructions according to the present disclosure further include a data moving instruction for reading the credit number as described above in the present disclosure. For convenience of description, the data moving instruction for reading the credit number may be recorded as a third type instruction.

FIG. 17 illustrates an example of the third type instruction according to the present disclosure. As illustrated in FIG. 17, the instruction is an R-type instruction (indicated by opcode being a fixed value [0110011]), the instruction is a data moving instruction (indicated by func3 being a fixed value [000]), and a type of the data moving instruction corresponding to the instruction is ④ (indicated by a code of func7 according to the present disclosure). At least some bits in the destination register of the instruction indicate the credit number as described above in the present disclosure, and at least some bits in the second source register in the instruction indicate the DMA ID as described above in the present disclosure. The number of requests for data stored in the corresponding DMA may be read through the instruction. In another example, at least some bits in a second source register in the third type instruction illustrated in FIG. 17 also indicate the channel ID as described above in the present disclosure.

In data moving according to the present disclosure, the data to be moved may be a segment of consecutive data, a start address of the segment of consecutive data may be determined by the offset address information as described above in the present disclosure, and the size of the segment of consecutive data may be determined by the length information as described above in the present disclosure. Through the first type instruction and the second type instruction as described above in the present disclosure, moving of a segment of consecutive data and moving of control information for the segment of consecutive data may be implemented.

However, the present disclosure is not limited thereto. In data moving according to the present disclosure, the data to be moved may also be a plurality of segments of consecutive data. An example of an instruction for moving the plurality of segments of consecutive data according to the present disclosure will be described below in conjunction with FIG. 18 to FIG. 20.

Figure 18:
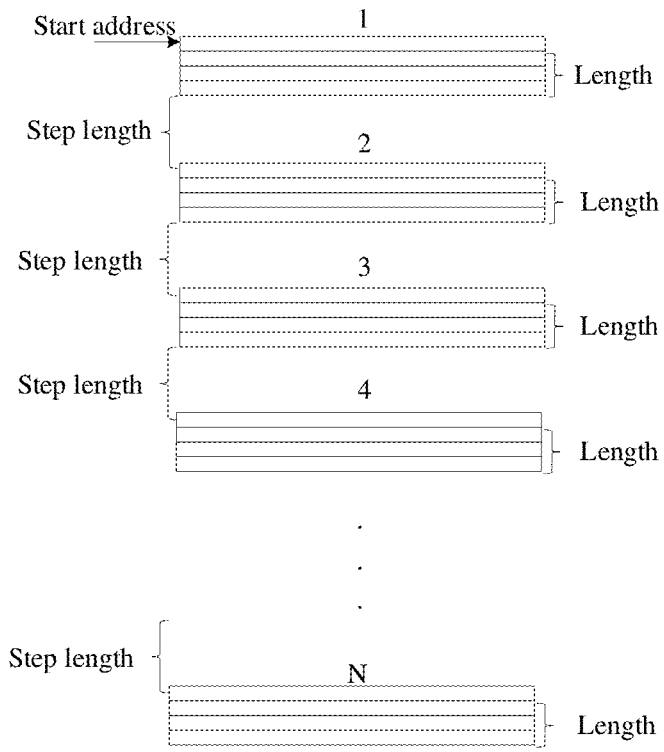
FIG. 18 illustrates a schematic example of a plurality of segments of consecutive data.

FIG. 18 illustrates a schematic example of a plurality of segments of consecutive data. As illustrated in FIG. 18, a start address of a 1st segment of consecutive data is an address of a first piece of data thereof, the 1st segment of consecutive data has four pieces of data in total, and after the first piece of data is removed, length information of remaining pieces of data is 3, so length information of the 1st segment of consecutive data is 3; an interval between an address of a first piece of data of a 2nd segment of consecutive data and an address of a last piece of data of the 1st segment of consecutive data is referred to as a step length, and length information of the 2nd segment of consecutive data is the same as the length information of the 1st segment of consecutive data (i.e. 3); an interval between an address of a first piece of data of a 3rd segment of consecutive data and an address of a last piece data of the 2nd segment of consecutive data is also a step length, and length information of the 3rd segment of consecutive data is the same as the length information of the 1st segment of consecutive data (i.e., 3); and so on, there are N segments of consecutive data in total. It may be seen from FIG. 18 that an address of each piece of data in the plurality of segments of consecutive data may be determined by start address, length, step length, and the number of segments.

Figure 19:
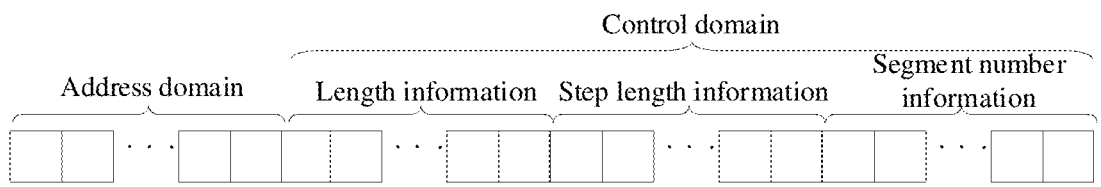
FIG. 19 illustrates an example of an instruction including codes indicating start address and feature information of the plurality of segments of consecutive data.

In data moving according to the present disclosure, in order to implement moving of the plurality of segments of consecutive data, it is necessary to encode the start address and feature information of the plurality of segments of consecutive data. FIG. 19 illustrates an example of an instruction including codes indicating the start address and the feature information of the plurality of segments of consecutive data.

As illustrated in FIG. 19, the instruction includes an address domain and a control domain; the address domain can use at least one bit to encode the start address of the plurality of segments of consecutive data, and the control domain can use a plurality of bits to encode the feature information of the plurality of segments of consecutive data; and the feature information includes length information, step length information, and segment number information illustrated in FIG. 18.

Figure 20:
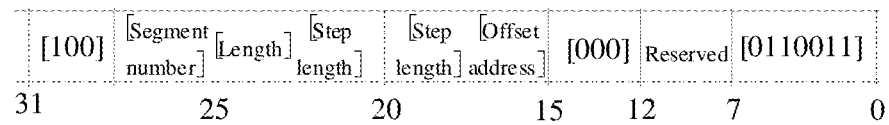
FIG. 20 illustrates another example of an instruction for moving the plurality of segments of consecutive data according to the present disclosure.

In the present disclosure, the instruction including the codes indicating the start address and the feature information of the plurality of segments of consecutive data may be an R-type instruction. FIG. 20 illustrates another example of an instruction for moving the plurality of segments of consecutive data according to the present disclosure.

As illustrated in FIG. 20, the instruction is an R-type instruction (indicated by opcode being a fixed value [0110011]), the instruction is a data moving instruction (indicated by func3 being a fixed value [000]), and the type of the data moving instruction corresponding to the instruction is ① (indicated by a code of func7 according to the present disclosure). At least some bits in a first source register of the instruction may indicate offset address information of the plurality of segments of consecutive data. For example, 27 bits in the first source register are used to encode the offset address information. At least some bits in a second source register of the instruction may indicate the length information as described in the present disclosure in conjunction with FIG. 18. For example, 8 bits in the second source register are used to encode the length information. At least some bits in the second source register of the instruction may indicate the segment number information as described in the present disclosure in conjunction with FIG. 18. For example, 5 bits in the second source register are used to encode the segment number information. In the example, some bits in the first source register and some bits in the second source register of the instruction may be used to encode the step length information as described in the present disclosure in conjunction with FIG. 18. For example, 5 bits in the first source register are taken as high-order bits of a code of the step length information, and 8 bits in the second source register are taken as low-order bits of the code of the step length information. The source register resource may be fully used to encode the step length information by jointly using some bits in the first source register and some bits in the second source register.

In an optional example, the instructions described above in conjunction with FIG. 19 and FIG. 20 may also include a code indicating at least one of the DMA ID and the channel ID as described above in the present disclosure.

In order to form a complete instruction set, the instructions according to the present disclosure may be encoded by using 2 bits of the ACDM FLAG field in the R-type instruction. For example, with respect to four types of instructions below: a data moving instruction for executing moving on the data to be moved, a data moving instruction for executing moving on the control information, a data moving instruction for executing moving on the data to be moved which are a plurality of segments of consecutive data, and a data moving instruction containing a code indicating the second moving status information (e.g., information that the task of data moving has been completed), codes of the ACDM FLAG field corresponding thereto are as follows:

| Instruction types | ACMD FLAG codes |
|---|---|
| Data moving instruction for executing moving on the data to be moved | 00 |
| Data moving instruction for executing moving on the control information | 10 |
| Data moving instruction for executing moving on the data to be moved which are a plurality of segments of consecutive data | 11 |
| Data moving instruction containing a code indicating the second moving status information | 01 |

The instructions according to the present disclosure have been described above, and the present disclosure proposes an instruction solution of controlling the DMA based on a coprocessor. The coprocessor executes some algorithms to cut the data of the input feature map or the filter and output an instruction, some data of the input feature map or the filter having been cut has a mapping relationship of the input feature map or the filter, and the DMA decodes the instruction output by the coprocessor and moves the data according to a decoding result, thereby simplifying the hardware structure of the DMA and improving flexibility of the RS NPU system.

As described above in the present disclosure, in a complex NPU system of a row stationary data flow, the DMA needs to move data according to the mapping relationship of the data. Due to discontinuity of data in the NPU system and complexity of the mapping relationship, if a corresponding DMA hardware structure is designed according to the specific mapping relationship of the data to execute data moving, the DMA hardware structure will be extremely complex, and the DMA hardware structure designed according to a certain mapping relationship of the data will solidify the mapping relationship of the data, resulting in inflexibility of the NPU system.

In order to solve the above-described technical problem, the present disclosure proposes a DMA solution based on the coprocessor. The coprocessor executes some algorithms to cut the data of the input feature map or the filter and output an instruction, some data of the input feature map or the filter having been cut has a mapping relationship of the input feature map or the filter, and the DMA decodes the instruction output by the coprocessor and moves the data according to a decoding result, thereby simplifying the hardware structure of the DMA and improving flexibility of the RS NPU system.

Figure 21:
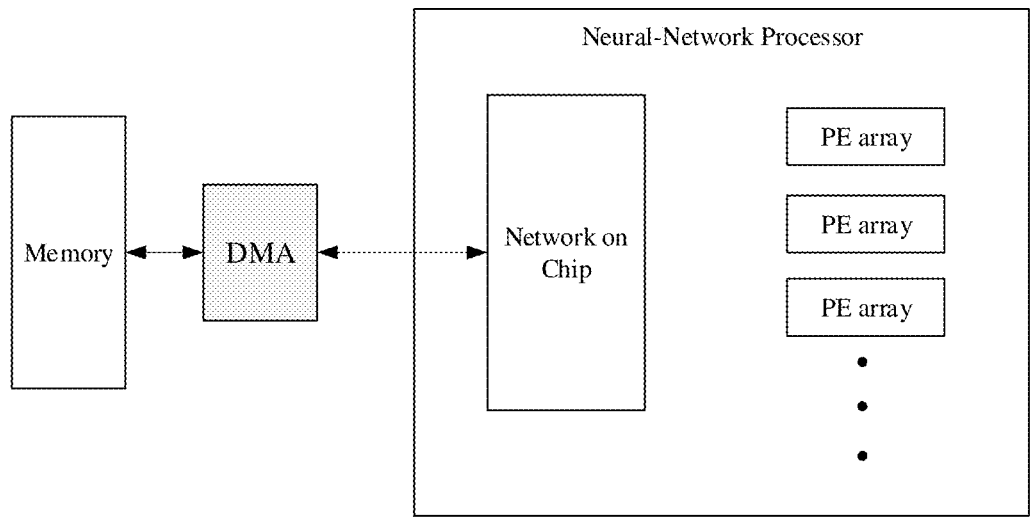
FIG. 21 illustrates an exemplary architecture diagram of a system to which DMA is applied according to the present disclosure.

FIG. 21 illustrates an exemplary architecture diagram of a system to which DMA is applied according to the present disclosure. As illustrated in FIG. 21, the system includes a memory, a DMA and a neural-network processor. The memory is configured to store data of a neural network, for example, a convolution kernel or an input feature map, and the memory may be either an off-chip DRAM or an on-chip SRAM. The neural-network processor may be the neural-network processor as described in the present disclosure in conjunction with FIG. 2 or FIG. 13, the neural-network processor includes a Network on Chip and a plurality of PE arrays, and these PE arrays are interconnected through the Network on Chip. The DMA can connect the Network on Chip and the PE array within the neural-network processor through a bus, and is responsible for data moving between the memory and the PE array in the neural-network processor.

Figure 22:
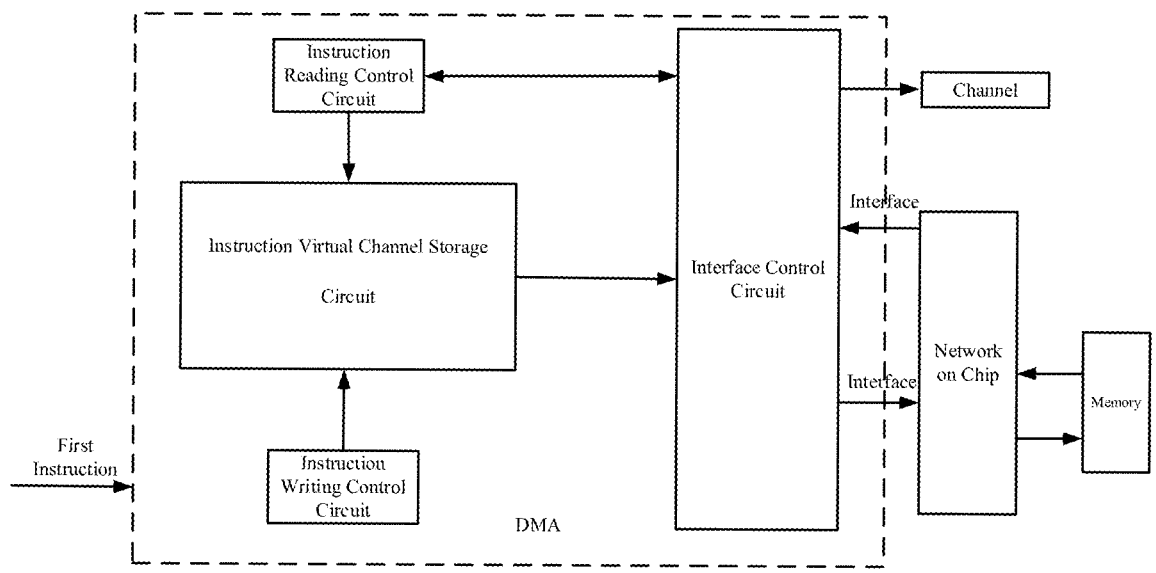
FIG. 22 illustrates a structural schematic diagram of an example of a DMA architecture according to the present disclosure.

FIG. 22 illustrates a structural schematic diagram of an example of a DMA architecture according to the present disclosure. As illustrated in FIG. 22, the DMA includes an instruction reading control circuit, an instruction writing control circuit, an instruction virtual channel storage circuit, and an interface control circuit. The instruction writing control circuit is configured to write a first instruction received into the instruction virtual channel storage circuit, the first instruction indicates address information of target data to be moved, and the address information of the target data is obtained based on a mapping relationship between the target data and at least one PE in the PE array of the neural-network processor; for example, the target data has the mapping relationship of the input feature map or the filter as described in the present disclosure. In the example, the address information of the target data is the address information of the target data in the memory. In another example, the first instruction may be the first type instruction as described in the present disclosure in conjunction with FIG. 15. The instruction virtual channel storage circuit is configured to store the first instruction, which may be a SRAM. The instruction reading control circuit is configured to read the first instruction from the instruction virtual channel storage circuit into the interface control circuit according to status information of the channel. For example, if the channel is idle, the first instruction may be fetched and transmitted to the interface control circuit; if the channel is busy, fetching the first instruction is prohibited. The interface control circuit is configured to generate a data moving request according to the address information of the target data, and transmit the data moving request to the Network on Chip; the Network on Chip moves the target data from the memory to the interface control circuit according to the data moving request; and the interface control circuit transmits the target data to a post-stage module (e.g., the GLB) of the corresponding channel.

Figure 23:
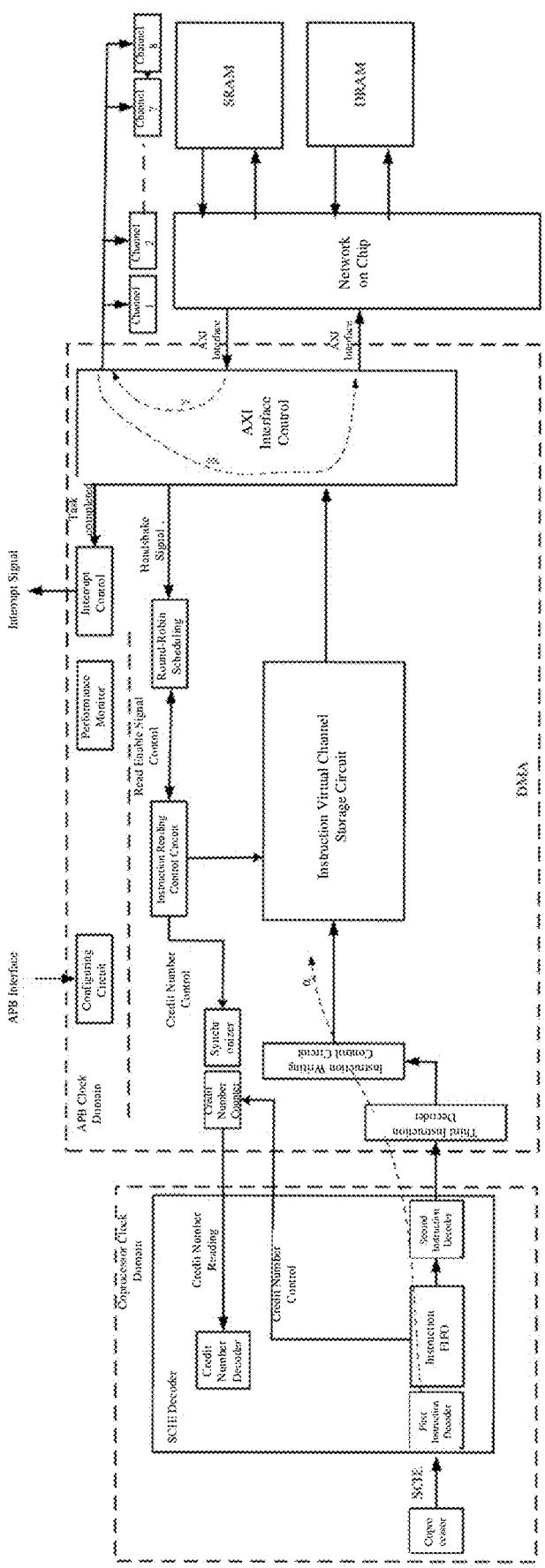
FIG. 23 illustrates a structural schematic diagram of another example of a DMA architecture according to the present disclosure.

FIG. 23 illustrates a structural schematic diagram of another example of a DMA architecture according to the present disclosure. As illustrated in FIG. 23, a Serial Communication Interface Expanded (SCIE) decoder is located in a coprocessor clock domain, and the coprocessor outputs an instruction through an SCIE bus interface. It should be understood that the instruction output by the coprocessor may be the instruction as described above in the present disclosure. Exemplarily, the instruction output by the coprocessor may be the first type instruction as described in the present disclosure in conjunction with FIG. 15, and some bits of the second source register of the first type instruction also indicate the DMA ID and the channel ID in the DMA. Exemplarily, the instruction output by the coprocessor may also be the third type instruction as described in the present disclosure in conjunction with FIG. 17, and some bits of the second source register of the third type instruction also indicate the channel ID in the DMA. For convenience of description, the first type instruction here is recorded as instruction 1 hereinafter, and the third type instruction is recorded as instruction 3.

The SCIE decoder includes a first instruction decoder (e.g., which may correspond to a fourth decoding circuit according to the present disclosure), and instruction 1 or instruction 3 output by the coprocessor is transmitted to the first instruction decoder. The first instruction decoder is configured to perform first layer decoding on instruction 1 or instruction 3, to judge whether the instructions output by the coprocessor is a preset type and whether the output instruction is a read instruction or a write instruction. Exemplarily, the first instruction decoder may be configured to judge whether the instruction output by the coprocessor is an R-type data moving instruction. In the example, the first instruction decoder decodes the opcode field and the func3 field in instruction 1 or instruction 3, to obtain that instruction 1 or instruction 3 is an R-type data moving instruction. The first instruction decoder may further be configured to determine whether the instruction is a read instruction or a write instruction; if a decoding result of the first instruction decoder is that the instruction output by the coprocessor is a data moving instruction of type ①　or ② or ③ as described above in the present disclosure, the instruction is a write instruction; if a decoding result of the first instruction decoder is that the instruction output by the coprocessor is a data moving instruction of type ④ or ⑤ as described above in the present disclosure, the instruction is a read instruction. In the example, the first instruction decoder decodes the func7 field in instruction 1 or instruction 3, to obtain that instruction 1 is a write instruction and instruction 3 is a read instruction.

The SCIE decoder may further include an instruction First Input First Output (FIFO) queue and a credit number decoder; if the decoding result of the first instruction decoder is that the instruction output by the coprocessor is a preset type and the output instruction is a write instruction, the decoded instruction is written into the instruction FIFO; if the decoding result of the first instruction decoder is that the instruction output by the coprocessor is a preset type and the output instruction is a read instruction, a numerical value of a credit number counter in the DMA is read according to the decoded read instruction. Exemplarily, after the first instruction decoder decodes the func7 field in instruction 1, the decoded instruction 1 may be written into the instruction FIFO; after the first instruction decoder decodes the func7 field in instruction 3, the SCIE decoder may read the numerical value of the credit number counter in the DMA according to the decoded instruction 3, and decode the read credit number through the credit number decoder, so as to obtain the number of writable write instructions in one or more channels in the DMA (i.e., the number of requests for data as described in the present disclosure).

In the coprocessor clock domain, every time a write instruction is written in the instruction FIFO, the credit number counter in DMA may be controlled to subtract 1. For example, when decoded instruction 1 is written into the instruction FIFO, the credit number counter may be controlled to subtract 1. If the SCIE decoder parses out that the credit number of instruction 3 is 0 (i.e., the DMA has no space for continuing to store any instruction), then decoded instruction 1 has to wait for the write instruction FIFO, until the credit number is parsed out not to be 0 (i.e., the DMA has space for continuing to store instructions), before writing decoded instruction 1 into the instruction FIFO.

The SCIE decoder further includes a second instruction decoder (e.g., which may correspond to a third decoding circuit according to the present disclosure), and the instruction FIFO may transmit the decoded instruction 1 to the second instruction decoder. The second instruction decoder may perform second layer decoding on the instruction, to judge which DMA the instruction is transmitted to. In the example, the second instruction decoder decodes the field indicating the DMA ID in instruction 1, to obtain a signal indicating which DMA instruction 1 will be written into. The DMA in FIG. 23 is determined according to the decoded DMA ID. After the second instruction decoder decodes instruction 1, decoded instruction 1 may be transmitted to a third instruction decoder.

The DMA in FIG. 23 is located in the NPU clock domain, and the third instruction decoder (e.g., which may correspond to the second decoding circuit according to the present disclosure) is located in the DMA. Because the DMA and the coprocessor are located in different clock domains, the instruction FIFO in the SCIE decoder may use asynchronous FIFO to perform instruction synchronization. The third instruction decoder may perform third layer decoding on the instruction, to judge which channel in the DMA the instruction is written into. In the example, the third instruction decoder decodes a field indicating the channel ID in instruction 1, to obtain which channel in the DMA instruction 1 will be written into.

The DMA further includes an instruction writing control circuit and an instruction virtual channel storage circuit. The instruction virtual channel storage circuit includes a storage region corresponding to each channel. As illustrated in FIG. 23, the DMA includes a total of eight channels: channel 1, channel 2, channel 3, channel 4, channel 5, channel 6, channel 7, and channel 8, and each channel corresponds to the GLB as described above in the present disclosure. The DMA is configured to move data to the GLB respectively on corresponding channel. The instruction virtual channel storage circuit includes eight storage regions, and each storage region is configured to store a write instruction on a corresponding channel. For example, if the DMA is configured to move data to GLB #1 on channel 1, storage region #1 stores a write instruction on channel 1; if the DMA is configured to move data to GLB #2 on channel 2, storage region #2 stores a write instruction on channel 2, and so on. The instruction writing control circuit is configured to write a decoded instruction to a storage region of a corresponding channel in the instruction virtual channel storage circuit according to the decoding result of the third instruction decoder. For example, if the decoding result of the third instruction decoder is channel 1, the instruction writing control circuit may write decoded instruction 1 to storage region #1 corresponding to channel 1 in the instruction virtual channel storage circuit.

In an optional example, the instruction writing control circuit may control a write address. A start address and an end address of each storage region in the instruction virtual channel storage circuit may be configured through a configuring circuit in the DMA. In the example, the configuring circuit is located in an Advanced Peripheral Bus (APB) clock domain, and interacts through an APB interface. If the instruction writing control circuit successfully writes an instruction from a write address in a storage region, the instruction writing control circuit may control the write address to add 1, so as to facilitate writing an instruction from a next write address in the storage region next time. When the write address reaches the end address of the storage region, the instruction writing control circuit may control the write address to flip, so as to facilitate writing an instruction from the start address of the storage region next time.

In an optional example, the instruction writing control circuit may further judge whether the storage region of the corresponding channel in the instruction virtual channel storage circuit is full. If the storage region of the corresponding channel is full (i.e., there is no address space for further storing any write instruction), a signal indicating that the corresponding channel is full is output; optionally, if the storage region of the corresponding channel is full and there is still a write request, an error signal is output. If the storage region of the corresponding channel is not full (i.e., there is an address space for further storing a write instruction), a write enable signal (recorded as wr_en) is output, and the instruction virtual channel storage circuit may write the decoded instruction to the storage region of the corresponding channel according to the write enable signal. For example, if the decoding result of the third instruction decoder is channel 1 and the instruction writing control circuit outputs the write enable signal, the instruction writing control circuit may write decoded instruction 1 to storage region #1 corresponding to channel 1 in the instruction virtual channel storage circuit. So far, the DMA has completed writing of instruction 1, and a data flow of writing instruction 1 into the instruction virtual channel storage circuit is as illustrated by a dotted line a in FIG. 23.

A reading process of instruction 1 will be further illustrated below in conjunction with FIG. 23.

The DMA further includes a round-robin scheduling circuit and an instruction reading control circuit. The round-robin scheduling circuit is configured to determine form which channel in the instruction virtual channel circuit to read the written write instruction, and the round-robin scheduling circuit may generate a channel tag signal (ch_tag) and transmit the channel tag signal to the instruction reading control circuit. The instruction reading control circuit reads the write instruction of the corresponding channel in the instruction virtual channel storage circuit according to the channel tag. For example, instruction 1 is written into storage region #1 corresponding to channel 1 in the instruction virtual channel storage circuit, if a signal generated by the round-robin scheduling circuit is a channel 1 tag signal, the instruction reading control circuit may read instruction 1 from storage region #1.

The instruction reading control circuit may control a read address. A start address and an end address of each storage region in the instruction virtual channel storage circuit may be configured through the configuring circuit in the DMA. If the instruction reading control circuit successfully reads an instruction from a read address in a storage region, the instruction reading control circuit may control the read address to add 1, so as to facilitate reading an instruction from a next read address in the storage region next time. When the read address reaches the end address of the storage region, the instruction reading control circuit may control the read address to flip, so as to facilitate reading the instruction from the start address of the storage region next time.

In an optional example, the instruction reading control circuit may further judge whether the storage region of the corresponding channel in the instruction virtual channel storage circuit is empty according to the channel tag signal. If there is no readable instruction in the storage region of the corresponding channel, a signal indicating that the instruction is empty is returned; optionally, if the storage region of the corresponding channel is empty and there is still a read request, an error signal is output; if there is a readable instruction in the storage region of the corresponding channel, a read enable signal (recorded as rd_en) is returned, and the round-robin scheduling circuit may select a channel to read the instruction according to the read enable signal.

Every time successfully reading one instruction from the instruction virtual channel storage circuit, the instruction reading control circuit may control the credit number counter to add 1. Exemplarily, every time successfully reading one instruction, the instruction reading control circuit may generate a credit number add signal (recorded as credit_add), and then synchronize the credit_add signal to the credit number counter through a synchronizer, so that a numerical value of the credit number counter is added by 1. In the example in FIG. 23, a size of available space of the storage region in the instruction virtual channel storage circuit may be reflected in real time by dynamically adjusting the numerical value of the credit number counter, which reduces an error rate of instruction writing and improves performance of the NPU system.

The DMA further includes an AXI interface control circuit, the round-robin scheduling circuit is controlled by a handshake signal of a post-stage circuit (e.g., the GLB in the example in FIG. 23) and an AXI handshake signal fed back by the AXI interface control circuit, and these handshake signals are used to indicate a state of a channel and switch time. Exemplarily, if data moving is being performed on current channel 1, which indicates that the current channel 1 is not idle, then no signal for handshaking (e.g. valid AXI request) will be generated on channel 1; if data moving task has been completed on the current channel 1 or the current channel 1 is idle, channel 1 may generate a signal for handshaking. Exemplarily, if the current AXI interface control circuit is performing data processing (which will be described in detail below), no signal for handshaking (e.g., valid AXI request) will be generated; and if the current AXI interface control circuit is idle, it may generate a signal for handshaking.

The instruction reading control circuit may read an instruction from the instruction virtual channel storage circuit to the AXI interface control circuit; after receiving the instruction read from the instruction virtual channel storage circuit, the AXI interface control circuit will perform fourth layer decoding on the instruction (e.g., corresponding to a first decoding circuit according to the present disclosure), for extracting data content required by a post-stage circuit of the AXI interface control circuit (e.g., the GLB in the example in FIG. 23) and performing a conversion operation according to the extracted data content, while simultaneously generating an AXI request corresponding to the extracted data content. In the example, after receiving instruction 1, the AXI interface control circuit decodes the fields indicating the offset address information and the length information in instruction 1, to obtain address information of the data to be moved, and then the AXI interface control circuit performs operations such as burst length control, cross 4K address check, etc. according to the address information of the data to be moved, and meanwhile, generates a corresponding AXI request. So far, the DMA has completed reading instruction 1 and converting instruction 1 into the AXI request recognizable by the NPU system.

The DMA may transmit the AXI request to the Network on Chip, and the Network on Chip, according to the AXI request, may read the data to be moved from the SRAM and perform data moving, or may read the data to be moved from the DRAM and perform data moving. A data flow of moving the data from the SRAM or the DRAM to the GLB of the corresponding channel is as illustrated by a dotted line y in FIG. 23.

The DMA further includes an interrupt control circuit located in the APB clock domain. After transmission of all data and/or instructions to be moved is completed, the AXI interface control circuit may generate a transmission done signal (recorded as trans_done) to indicate task completed. The interrupt control circuit generates an interrupt signal and outputs the same according to the received transmission done signal. The DMA further includes a performance monitor located in the APB clock domain, configured to test the performance of the DMA.

In the present disclosure, the writing and reading processes of the second type instruction in the present disclosure by the DMA illustrated in FIG. 23 are similar to the writing and reading processes of instruction 1, and the difference is that: after the second type instruction is read from the instruction virtual channel storage circuit, the second type instruction is directly transmitted to a post-stage circuit of the DMA (e.g., the GLB) without converting the second type instruction into an AXI request, so as to implement transmission of information carried on the second type instruction (e.g., control information or status information as described above in the present disclosure).

The present disclosure uses specific words to describe the embodiments of the present disclosure. For example, "the first/second embodiment", "an embodiment", and/or "some embodiments" refer to a certain feature, structure, or characteristic related to at least one embodiment of the present disclosure. Therefore, it should be emphasized and noted that, "an embodiment" or "one embodiment" or "an alternative embodiment" described twice or more in different positions in this specification does not necessarily refer to the same embodiment. In addition, certain features, structures, or characteristics in one or more embodiments of the present disclosure may be appropriately combined.

In addition, those skilled in the art may understand that various aspects of the present disclosure may be illustrated and described through a number of patentable categories or situations, including any new and useful combination of processes, machines, products or substances, or any new and useful improvements to them. Accordingly, the respective aspects of the present disclosure may be completely executed by hardware, software (including firmware, resident software, microcode, etc.), or a combination of hardware and software. The above-mentioned hardware or software may all be referred to as "data block", "module", "engine", "unit", "component" or "system". Further, various aspects of the present disclosure may be represented as a computer product located in one or more computer readable media, and the product includes computer readable program codes.

Unless otherwise defined, all terms used herein (including technical and scientific terms) have the same meaning as commonly understood by those ordinarily skilled in the art to which the present disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present disclosure.

The above are illustrations of the present disclosure, and should not be considered as limitations thereof. Although several exemplary embodiments of the present disclosure are described, those skilled in the art will readily understand that a number of modifications can be made to the exemplary embodiments without departing from novel teaching and advantages of the present disclosure. Therefore, all these modifications are intended to be included in the scope of the present disclosure as defined in the claims. It should be understood that, the above are illustrations of the present disclosure, and should not be considered as limited to the specific embodiments disclosed, and the modifications to the disclosed embodiments and other embodiments are intended to be included in the scope of the appended claims. The present disclosure is defined by the claims and equivalents thereof.

The invention claimed is:

1. A data moving method for a direct memory access apparatus, comprising:
receiving an object data moving instruction and decoding the object data moving instruction, by the direct memory access apparatus, wherein the object data moving instruction comprises an address domain and a control domain, the address domain of the object data moving instruction indicates address information of a segment of consecutive data in a plurality of segments of consecutive data, and the control domain of the object data moving instruction indicates control information for the address information of the segment of consecutive data; and
executing, by the direct memory access apparatus, moving of the plurality of segments of consecutive data, according to the address information of the segment of consecutive data and the control information of the segment of consecutive data,
wherein the object data moving instruction further comprises a type domain, and the type domain of the object data moving instruction indicates a data moving operation for a neural-network processor; and
the data moving method comprises:
executing, by the direct memory access apparatus, moving of the plurality of segments of consecutive data for the neural-network processor.

2. The data moving method according to claim 1, wherein the neural-network processor comprises at least one processing unit array, and address information of the plurality of segments of consecutive data is obtained based on a mapping relationship between the plurality of segments of consecutive data and at least one processing unit in the processing unit array.

3. The data moving method according to claim 1, wherein the address information of the segment of consecutive data comprises offset address information and length information.

4. The data moving method according to claim 1, wherein the control information for the address information of the segment of consecutive data comprises step length information for controlling a jump length of the address information of the segment of consecutive data.

5. The data moving method according to claim 4, wherein the control information for the address information of the segment of consecutive data further comprises count information for controlling an amount of jumps of the address information of the segment of consecutive data.

6. The data moving method according to claim 5, wherein the count information is identical to segment number information of the plurality of segments of consecutive data.

7. The data moving method according to claim 1, wherein the object data moving instruction further comprises a first identification domain, the first identification domain indicates an identification of the target direct memory access apparatus, and the data moving method further comprises:
acquiring the identification of the target direct memory access apparatus from the first identification domain of the object data moving instruction; and
storing the object data moving instruction into the target direct memory access apparatus, according to the identification of the target direct memory access apparatus.

8. The data moving method according to claim 1, wherein the direct memory access apparatus comprises a storage unit comprising a plurality of storage regions, the object data moving instruction further comprises a second identification domain, and the second identification domain indicates an identification of a storage region of the plurality of storage regions; and the data moving method further comprises:
acquiring, by the direct memory access apparatus, the identification of the storage region from the second identification domain of the object data moving instruction; and
storing, by the direct memory access apparatus, the object data moving instruction into the storage region, according to the identification of the storage region.

9. The data moving method according to claim 1, wherein the object data moving instruction is a register type instruction.

10. The data moving method according to claim 9, wherein some bits in a first source register or a second source register of the object data moving instruction are used in the control domain to indicate step length information, count information, offset address information or length information.

11. The data moving method according to claim 10, wherein the step length information is 13 bits, the count information is 5 bits, the offset address information is 27 bits, and the length information is 8 bits.

12. The data moving method according to claim 3, wherein the control information for the address information of the segment of consecutive data comprises step length information for controlling a jump length of the address information of the segment of consecutive data.

13. The data moving method according to claim 12, wherein the control information for the address information of the segment of consecutive data further comprises count information for controlling an amount of jumps of the address information of the segment of consecutive data.

14. The data moving method according to claim 13, wherein the count information is identical to the segment number information of the plurality of segments of consecutive data.

15. The data moving method according to claim 5, wherein the object data moving instruction is a register type instruction.

16. The data moving method according to claim 15, wherein some bits in a first source register or a second source register of the object data moving instruction are used in the control domain to indicate step length information, count information, offset address information or length information.

17. The data moving method according to claim 16, wherein the step length information is 13 bits, the count information is 5 bits, the offset address information is 27 bits, and the length information is 8 bits.

18. A non-volatile computer readable storage medium, on which a computer program for data moving of a direct memory access apparatus is stored, wherein the computer program, when run by a processor, causes the processor to execute a data moving method for the direct memory access apparatus, and the data moving method comprises:
receiving, by the direct memory access apparatus, an object data moving instruction and decoding the object data moving instruction, wherein the object data moving instruction comprises an address domain and a control domain, the address domain of the object data moving instruction indicates address information of a segment of consecutive data in a plurality of segments of consecutive data, and the control domain of the object data moving instruction indicates control information for the address information of the segment of consecutive data; and
executing, by the direct memory access apparatus, moving of the plurality of segments of consecutive data, according to the address information of the segment of consecutive data and the control information of the segment of consecutive data,
wherein the object data moving instruction further comprises a type domain, and the type domain of the object data moving instruction indicates a data moving operation for a neural-network processor; and
the data moving method comprises:
executing, by the direct memory access apparatus, moving of the plurality of segments of consecutive data for the neural-network processor.

19. A non-volatile processor readable medium, on which instructions are stored, wherein the instructions are configured to cause a processor to execute a data moving method for a direct memory access apparatus, and the data moving method comprises:
receiving, by the direct memory access apparatus, an object data moving instruction and decoding the object data moving instruction, wherein the object data moving instruction comprises an address domain and a control domain, the address domain of the object data moving instruction indicates address information of a segment of consecutive data in a plurality of segments of consecutive data, and the control domain of the object data moving instruction indicates control information for the address information of the segment of consecutive data; and
executing, by the direct memory access apparatus, moving of the plurality of segments of consecutive data, according to the address information of the segment of consecutive data and the control information of the segment of consecutive data,
wherein the object data moving instruction further comprises a type domain, and the type domain of the object data moving instruction indicates a data moving operation for a neural-network processor; and
the data moving method comprises:
executing, by the direct memory access apparatus, moving of the plurality of segments of consecutive data for the neural-network processor.

* * * * *